United States Patent

[11] 3,556,128

| [72] | Inventor | Paul J. Scaglione<br>30180 Richmond Hill Drive, Farmington, Mich. 48024 |
|---|---|---|
| [21] | Appl. No. | 820,563 |
| [22] | Filed | Apr. 30, 1969 |
| [45] | Patented | Jan. 19, 1971 |

[54] PRESSURE BALANCED REGULATING VALVE WITH FLARED COMPRESSION DISC
9 Claims, 3 Drawing Figs.

[52] U.S. Cl. .................................................. 137/219, 251/46; 137/491
[51] Int. Cl. .................................................. F16k 31/143; G05d 27/00
[50] Field of Search ....................................... 251/46; 137/219, 491

[56] References Cited
UNITED STATES PATENTS

| 2,630,831 | 3/1953 | Arnold | 251/46X |
| 2,687,868 | 8/1954 | Barrett et al. | 251/46X |
| 3,346,004 | 10/1967 | Costello | 251/46X |

*Primary Examiner*—Arnold Rosenthal
*Attorney*—Donnelly, Mentag & Harrington

ABSTRACT: A pressure balanced regulating valve capable of providing two stages of flow in one regulating valve structure. One stage provides low flow and, as the flow demand increases, a second or larger stage flow automatically comes into operation. The valve includes a high-pressure inlet passage and an outlet passage connected through a valve opening that is closed by a valve member provided with a compression disc that is spaced apart from the valve member so as to always be positioned in the high pressure inlet passage when the valve member is in both the open and closed positions to provide the valve member with a positive constant thrust pressure.

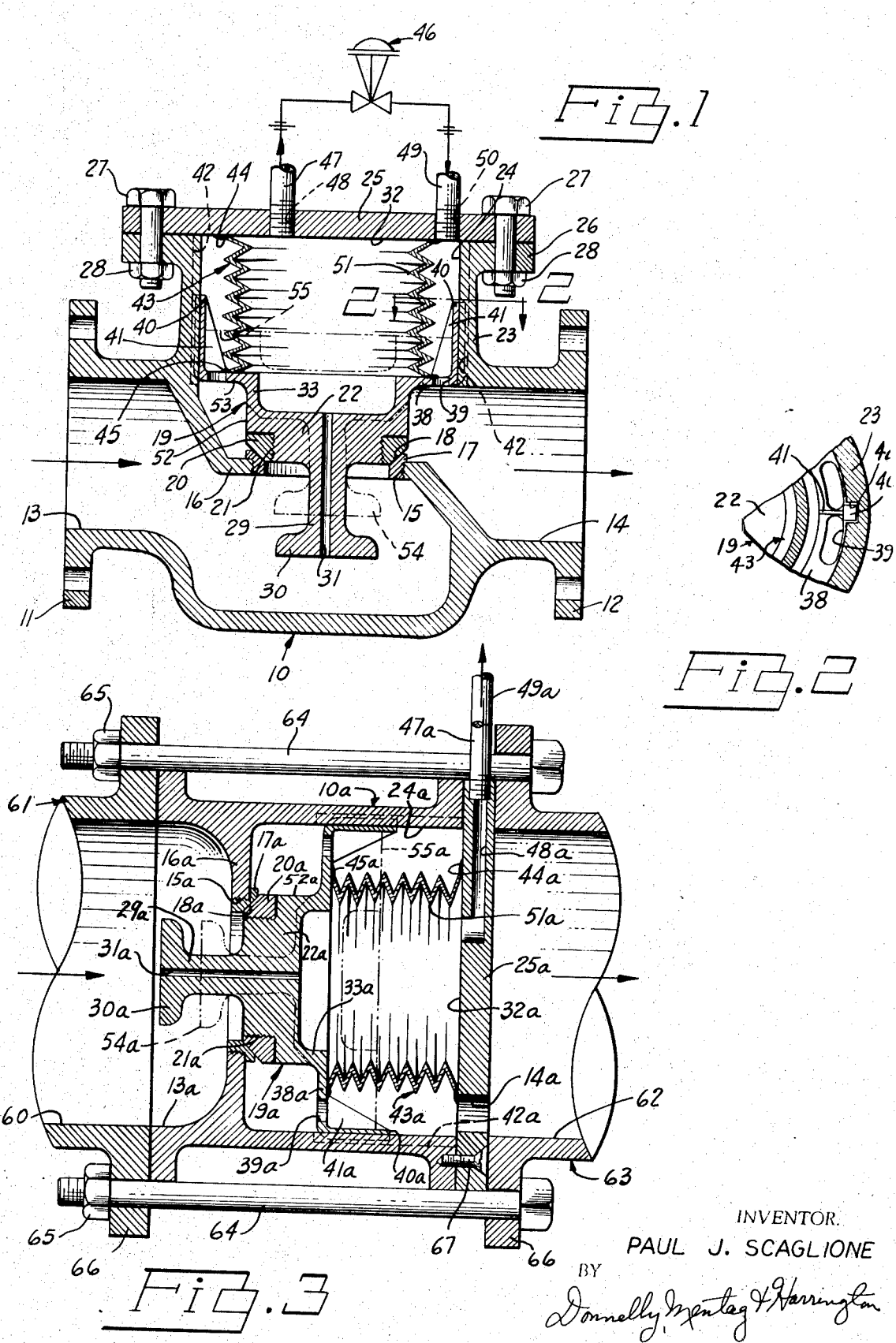

3,556,128

PRESSURE BALANCED REGULATING VALVE WITH FLARED COMPRESSION DISC

SUMMARY OF THE INVENTION

This invention relates generally to the valve art, and more particularly, to a novel and improved pressure balanced regulating valve.

It is necessary in many fluid flow systems to provide two stages of flow, as for example, in a system for conveying steam for heating purposes. In such a system it is necessary to have a first stage or flow for the summer load and a second stage or flow for the winter load. Heretofore, attempts have been made to provide the required two stages of flow in such systems by the use of one valve. However, difficulty was encountered in the first stage of a two-stage system where one valve was used because of the large pressure differential across the valve seat whereby when the valve lifts off from its seat a short distance it slams back and closes because it overshoots the load requirement, and a chattering of the valve results. I have heretofore invented a pressure balanced regulating valve which overcomes the disadvantages of the aforementioned valves and which is shown in my copending and allowed U.S. applications Ser. No. 585,522, entitled "Pressure Balanced Regulating Valve," now U.S. Pat. No. 3,493,008. I have found that my aforementioned "Pressure Balanced Regulating Valve" functions very well and efficiently in providing two stages of flow for various systems such as steam heating systems. However, I have found that it is advantageous to provide my aforementioned valve with means for assuring positive constant thrust pressure on the valve member during an operating cycle.

In view of the foregoing it is an important object of the present invention to provide a novel and improved "Pressure Balanced Regulating Valve" which is adapted to provide two stages of flow through a single valve and which overcomes the aforedescribed disadvantages of the prior art valves, and which further improves my aforementioned pressure balanced regulating valve.

Briefly, in accordance with the invention I provide a pressure balanced regulating valve capable of providing two stages of flow in one regulating valve structure. One stage provides low flow, and as the flow demand increases, a second or larger stage flow automatically comes into operation. The valve includes a high-pressure inlet passage and an outlet passage connected through a valve opening that is closed by a valve member provided with a flared compression disc that is spaced apart from the valve member so as to always be positioned in the high-pressure inlet passage when the valve member is in both the open and closed positions to provide the valve member with a positive constant thrust pressure.

Other objects, features and advantages of this invention will be apparent from the following detailed description, appended claims, and the accompanying drawings.

BRIEF DESCRIPTION OF THE DRAWING

FIG. 1 is an elevational section view of a first embodiment of a pressure balanced regulating valve made in accordance with the principles of the present invention;

FIG. 2 is a fragmentary, horizontal section view of the structure illustrated in FIG. 1, taken along the line 2—2 thereof, and looking in the direction of the arrows; and, FIG. 3 is an elevational section view of a second embodiment of a pressure balanced regulating valve made in accordance with the principles of the present invention.

DESCRIPTION OF THE PREFERRED EMBODIMENT

Referring now to the drawing, and in particular to FIG. 1, wherein is shown an illustrative embodiment of the invention, the numeral 10 generally designates the valve body of a first embodiment of a pressure balanced regulating valve made in accordance with the principles of the present invention. The body 10 is shown as being shaped in accordance with a standard-type globe valve for purposes of illustration. The valve body 10 is provided with a pair of flanged end connection members 11 and 12, by means of which the valve is bolted into a pressurized fluid flow system, as for example a steam or water supply system. It will be understood that the valve body 10 may be provided with screwed end connections, if desired.

The valve body 10 is provided with a high-pressure inlet passage 13, which represents the high-pressure side of the valve, and with an outlet passage 14 which represents the low-pressure side of the valve. The inlet passage 13 is connected to the outlet passage 14 by means of an opening 15 which is formed in the horizontal dividing wall 16. Suitably mounted in the opening 15 is an annular valve seat member 17 which has a conical valve seat 18 formed around the inner periphery thereof.

The flow of fluid under pressure from the inlet passage 13 into the outlet passage 14 is regulated by the raising and lowering of a disc cup or valve generally indicated by the numeral 19. The solid line position of the disc cup 19 in FIG. 1 illustrates the closed position of the valve 19, and the fully opened position of the valve or disc cup 19 is shown by the broken line position. The disc cup or valve 19 will move from the closed position to the fully opened position 20 in accordance with the flow requirements exerted on the valve.

As shown in FIG. 1 the lower end of the body 22 of the valve 19 is reduced in diameter and threaded as indicated by the numeral 21. Threadably mounted on the reduced valve body end 21 is an annular or ring-shaped facing seat member 20 which is provided with a conical face on the lower periphery thereof that is adapted to seat on the valve seat 18 when the valve 19 is in the closed position.

As shown in FIG. 1, the valve body 10 includes an upwardly extended cylindrical wall 23 which forms a low-pressure chamber 24 that is disposed in concentric alignment with the disc cup or valve 19. The low-pressure chamber 24 communicates with the low-pressure outlet passage 14, as more fully described hereinafter. The outer end of the low-pressure chamber 24 is enclosed by an end plate 25 which is secured to an integral flange 26 disposed around the outer end of the chamber wall 23, by a plurality of bolts 27 and nuts 28.

As shown in FIG. 1, the valve 19 is provided with an integral, downwardly extended shaft 29 which extends into the high-pressure passage 13. The shaft 29 is provided on its outer end with a flared compression disc member 30. The flared compression disc member 30 is spaced apart from the enlarged end 22 of the valve 19 so as to always be in the flow of high-pressure fluid in the inlet passage 13. The disc 30 is smaller in diameter than the opening through the valve seat 17, and it is also smaller in diameter than the internal diameter of the facing seat ring 20 so that it may also be slipped thereover in order to screw it onto the valve body threaded portion 21. The disc 30 is flared so that the maximum area can be subjected to the high-pressure fluid in the inlet passage 13 to provide the valve 19 with a positive constant thrust pressure to maintain the valve 19 in the open position. As shown in FIG. 1, the pressure disc 30 is in the broken line position 54 when the valve 19 is moved to the open position.

The disc cup or valve 19 further includes a cylindrical body 33 which has its lower end integrally connected to the valve seat portion 22, and its upper end connected to an integral flange 38 that extends perpendicularly outward from the valve body 33 toward the wall 23 of the low-pressure chamber 24.

The disc cup or valve 19 is provided with a plurality of radially spaced integral guide arms 40 which have a portion slidably mounted in mating, longitudinally extended slots 42 formed in the inner surface of the chamber wall 23, as shown in FIG. 2. Each of the guide arms 40 is provided with a reinforcing plate 41 which is welded to the inner face of each of the guide arms and to the flange 38. As shown in FIG. 2 the low-pressure chamber 24 is connected to the outlet passage 14 by a plurality of slots 39 which are formed through the flange 38.

As shown in FIG. 1, a high-pressure chamber 32 is formed within the low-pressure chamber 24 by a metallic hermetically sealed flexible-type bellows generally indicated by the numeral 43. The bellows 43 has its outer end sealed by any suitable means, as by welding as indicated by the numeral 44, to the inner side or face of the end plate 25. The inner end of the bellows 43 is secured to the upper face of the flange 38 by any suitable means, as by welding, as indicated by the numeral 45. The passage 31 in the shaft 29 discharges fluid under pressure from the high-pressure passage 13 into the chamber 32.

The position of the disc cup or valve 19 is determined by any suitable standard pilot valve, generally indicated by the numeral 46 in FIG. 1. The pilot valve 46 may be adapted for pressure control, temperature control or a combination of both. As shown in the illustrative embodiment of FIG. 1, the pilot valve 46 receives its signal from the high-pressure chamber 32 and the low-pressure chamber 24. The high-pressure chamber 32 is connected to one side of the pilot valve 46 by a suitable conduit 47 which has its inner end threadably mounted in the threaded hole or bleed port 48 which communicates with the chamber 32. The other side of the pilot valve 46 is connected by a suitable conduit as 49 through a threaded bleed port 50 which communicates with the low pressure chamber 24.

The operation of the pressure balanced regulating valve illustrated in FIGS. 1 and 2 will be described by assuming that the valve is connected in a pressurized fluid flow line and that the disc cup or valve 19 is in the closed position, or solid line position shown in FIG. 1. The high-pressure fluid in the inlet passage 13 cannot flow directly into the low-pressure outlet passage 14 because of the following described action. The high-pressure fluid enters the longitudinal bleed passage 31 in the shaft 29 and passes into the high-pressure chamber 32. The disc cup or valve 19 and bellows 43 are designed so that the chamber 32 will accumulate a greater counter internal force against the valve seat 18 than the initial force in the high-pressure passage 13 which is acting on the valve 19 and its compression disc 30 with a tendency to push the valve 19 upwardly away from the seat 18. This holding action of the disc cup or valve 19 on the seat 18 is accomplished by the fact that the combined internal areas of the valve 19 within the bellows 43 is greater than the area of the outer face or lower face of the valve body 22 which is exposed to the high-pressure passage 13, thereby creating a greater internal force operating to hold the disc cup or valve 19 on the seat 18 than the external force in the passage 13 which maintains a force trying to move the valve 19 to the open position. This holding force feature is explained in detail in my aforementioned copending application.

As shown in FIG. 1 the bellows 43 is designed and connected to the flange 38 of the disc cup or valve 19 so that the inner ends 51 of the folds of the bellows 43 are disposed concentric with the outer diameter 52 of the disc cup lower portion or body 22, but radially inward of the thickness of the bellows material. The lower end of the bellows 43 which is connected at the point 45 on the upper side of the flange 38 thus permits the lower pressure in the chamber 24 to act on the outer surface of the lower fold of the bellows 43 and the outer exposed portion of the upper surface of flange 38 so as to provide an external force acting on the disc cup 19 which will be equal to the external force acting on the lower side of the flange 38, as viewed in FIG. 1, so that the forces will be equalized at the lower face of the flange 38.

In the illustrative example, assuming that the pressure in the low-pressure passage 14 is to be maintained at 10 pounds per square inch, gage pressure, and that the pressure in the low-pressure passage 14 drops, then the pressure in the low-pressure passage 14 will act on the pilot valve 46 through the low-pressure chamber 24 and the conduit 49. This pressure drop will cause the pilot valve 46 to open, thus allowing high-pressure fluid to flow from the high-pressure chamber 32 through the conduit 47 and through the bleed passage 31 and the high-pressure inlet passage 13. This flow of pressurized fluid represents the first stage flow for low pressure or low loads. The bleed passages or conduits 47 and 49 are each greater in area than the bleed passage 31 in the shaft 29 so that the disc cup 19 will remain in the closed position so long as flow through the bleed passage 47 does not exceed the flow from the passage 31. This flow differential will handle extreme low flows of pressurized fluid through the first stage supply by way of the second stage high-pressure chamber 32.

Assuming that the pressure in the low-pressure passage 14 drops beyond the point of the first stage's supply capacity, then the flow of fluid under pressure from the high-pressure passage 13 through the bleed passage 31 will be greater than the flow of fluid from the low-pressure chamber 24 and the flow from the high-pressure chamber 32 through the bleed passage conduit 47 would be greater than that which is supplied by the smaller bleed passage 31. The last-mentioned differential in flow will cause the pressure in the high-pressure chamber 32 to be reduced to a point where it can no longer provide a closing force sufficient to resist the opening force acting on the high-pressure side of the lower face on the portion 22 of the disc cup 19. The force acting on the lower face of valve 19 will raise the valve 19 from the solid line position shown in FIG. 1 to the broken line position, thus allowing a second stage or large internal flow of fluid to pass from the high-pressure passage 13 through the opening in the valve seat 17 into the outlet passage 14. At this point in the operation of the valve there is now flow from both the first and second stages passing into the outlet passage 14.

The guide arms 40 are shown in FIG. 1 to be of such a length that when the valve 19 is raised to its fully opened or broken line position shown in FIG. 1, the guide arms 40 will abut the inner face of the plate 25 to stop compression of the bellows 43. The guide arms thus limit the movement of the valve 19 and the bellows 43 cannot be compressed any further so as to prevent damage to the bellows. The number of guide arms 40 may be any suitable number, as for example, three or more. The guide arms 40 further function to prevent twisting or cocking of the bellows 43 and the valve 19 due to turbulence in the flow of the fluid under pressure between the chambers 13 and 14. It will be seen that when the valve 19 is in the open position the compression disc 30 is moved to the broken line position 54 so as to remain in the flow of high-pressure fluid passing from the inner chamber 13 into the outlet passage 14 and thus assure positive constant thrust pressure for maintaining the valve 19 in the open position.

The flow of pressurized fluid through both stages of the valve continues until the low-pressure system which is being supplied by the valve has been satisfied. At that time, the pressure in the low-pressure outlet passage 14 will rise to its presumed pressure of 10 pounds per square inch, gage pressure, and when this pressure is reached it will act on the pilot valve 46 through the passage 49 to cause the pilot valve 46 to start closing. The closing of the pilot valve 46 commences a throttling action on the first stage flow through the bleed passage 47. As flow of pressurized fluid through the bleed passage or conduit 47 diminishes to less than what is being supplied through the smaller bleed passage 31 in the shaft 29, the pressure in the high-pressure chamber 32 starts to build up. As the pressure in the high-pressure chamber 32 comes to the full preset pressure it will commence closing the disc cup 19, and move it from the broken line position shown in FIG. 1 to the solid line closed position shown in FIG. 1. As the disc cup 19 begins to close, the flow pressure on the lower face of the valve body 22 will not be the same as on the lower face 53 of the disc cup flange 38, because of the disc cup cylindrical body portion 22 which spaces the flange 38 apart from the bottom surface of the valve portion 22 so that the main pressure will be passed to the low-pressure system before reaching the lower face 53 on the flange 38. As the high pressure shoots up toward the flange surface 53 it will adjust to the low-pressure in the passage 14 and will have no effect on the flange 38. This action will allow the full force inside the pressure chamber 32 to act on the inner face of the flange 38, and that force added to the force on the internal face of the valve 19, will, as previously described, overcome the force acting on the lower face of the valve portion 22 and the compression disc 30, thereby closing the disc cup or valve 19 and stopping all flow.

FIG. 3 illustrates a second embodiment of a pressure balanced regulating valve made in accordance with the principles of the present invention. The parts of the second embodiment which are the same as the parts of the first embodiment have been marked with the same reference numerals followed by the small letter a. The main difference between the second embodiment of FIG. 3 and the first embodiment of FIGS. 1 and 2 is that the second embodiment is made with the valve 19a and shaft 29a disposed in axial alignment with the direction of flow of the fluid flow system in which the valve is incorporated.

As shown in FIG. 3, the valve body 10a is provided with a high-pressure inlet passage 13a which is connected to the interior 60 of the pressurized fluid supply conduit 61. The low-pressure chamber 24a communicates through a plurality of outlet passage ports or holes 14a with the interior 62 of a fluid supply conduit 63. The valve body 10a is substantially cylindrical in overall configuration and is adapted to be connected between the fluid system conduit 61 and the conduit 63 by any suitable means, as by a plurality of bolts 64 and nuts 65 which are operatively mounted through the usual flanges 66 formed on said fluid conduits. As shown in FIG. 3, the outlet passage ports or holes 14a are formed through the end plate 25a. In the embodiment of FIG. 3, the end plate 25a is secured to the valve body 10a by any suitable means, as by a plurality of screws 67.

As shown in FIG. 3, the bleed passage 48a is formed in the end plate 25a, and the bleed conduit 47a for connecting the high-pressure chamber 32a to the pilot valve 46 is threadably mounted on the outer end of the passage 48a. As shown in FIG. 3, the bleed conduit 49a for connecting the low-pressure chamber 24a to the pilot valve 46 is also threadably mounted in the end plate 25a and communicates with the low-pressure chamber 24a through a conduit similar to the conduit 48a. The details of the passages for connecting the conduits 47a and 49a to their respective high and low-pressure chambers is shown in detail in FIG. 4 of my aforementioned copending application, and such structure is incorporated herein by reference. The valve illustrated in FIG. 3 functions in the same manner as the first embodiment of FIGS. 1 and 2 to provide a two-stage pressure balanced regulating valve. The second embodiment of the invention merely illustrates that the invention could be embodied in valves having different shaped conduit configurations in accordance with the desire of the user.

While it will be apparent that the preferred embodiments of the invention herein disclosed are well calculated to fulfill the objects above stated, it will be appreciated that the invention is susceptible to modification, variation and change.

I claim:

1. In a pressure balanced regulating valve for providing two stages of fluid flow in a fluid flow system and which comprises, a valve body provided with an inlet passage and an outlet passage; said passages being separated by a wall having a valve opening, with a valve seat around said opening for communicating said inlet passage with said outlet passage; a valve member mounted in said outlet passage and movable between a closed position in seating engagement with said valve seat and an open position spaced apart from said valve seat to allow flow of fluid from the inlet passage to the outlet passage; said valve member having a front end engageable with said valve seat and a rear end spaced apart longitudinally from said front end by an elongated structure having a closed outer surface, and said valve member further including an annular flange extended outwardly from said rear end so that the high-pressure of the fluid passing through the valve seat will dissipate itself to the low pressure in the outlet passage before reaching said annular flange; a hermetically sealed bellows in said valve body having one end fixed and the other end attached to the rear face of the flange on the rear end of said valve member so as to enclose an internal transverse face area of the valve member which is larger than the external face area on the front end of the valve member that is exposed to the inlet passage through the opening in said wall; a pilot valve; a first fluid conduit means communicating said inlet passage with the interior of said bellows and one side of said pilot valve; a second fluid conduit means communicating said outlet passage with the other side of the pilot valve and having a flow capacity larger than the flow capacity of said first fluid conduit means, whereby fluid under pressure will flow from the inlet passage into the bellows to provide a holding force on the valve member which is greater than the force exerted on the valve member by the pressurized fluid in the inlet chamber and when said pilot valve is activated a first stage of fluid flow will be initiated and fluid will pass from said inlet passage through said first and second fluid conduit means and said pilot valve into said outlet passage, said first stage of fluid flow continuing until the flow of fluid out of the second fluid conduit means into the outlet passage exceeds the flow of fluid passing from said inlet passage into said first conduit means whereby the holding force in the bellows will decrease and the force exerted on the valve member by the pressurized fluid in the inlet passage will move the valve member to the open position to initiate a second stage of full fluid flow through the regulating valve which continues until the pilot valve is deactivated whereby the flow through the first stage is terminated and the holding force in the bellows increases and moves the valve member to the closed position; said bellows being connected to the rear face of said flange so as to provide an area for engagement by fluid which is equal to the area engageable by fluid on the front face of the flange; and, wherein the improvement comprises: means attached to the front end of the valve member and spaced apart from said valve member so as to be disposed in the inlet passage when the valve member is in both the closed and open positions, whereby when the valve is in the open position said means will be subject to the pressurized fluid in the inlet passage to provide a positive constant holding pressure on the valve member.

2. A pressure balanced regulating valve as defined in claim 1, wherein: said means attached to the front side of said valve member comprises a disc member.

3. A pressure balanced regulating valve as defined in claim 2, wherein:
 a. said valve member is provided with guide means for guiding the movement of said valve member between said open and closed positions; and,
 b. said guide means includes:
  1. a plurality of slots in said valve body; and,
  2. a plurality of guide arms on said valve member slidably mounted on said slots and being of a length whereby when the valve member is moved to the open position the ends of the guide arms will abut the top flange of the valve to limit the movement of the valve member.

4. A pressure balanced regulating valve as defined in claim 2, wherein: said disc member is smaller in size than said valve opening.

5. A pressure balanced regulating valve as defined in claim 4, wherein: said valve member is provided with a detachable annular valve facing seat for seating engagement with said valve seat around said valve opening when the valve member is in the closed position.

6. A pressure balanced regulating valve as defined in claim 5, wherein: said annular valve facing seat on said valve member is larger in size than said disc member to allow the annular valve facing seat to be moved over the disc member.

7. A pressure balanced regulating valve as defined in claim 2, wherein: said first fluid conduit means includes a passage formed through said disc member to communicate the inlet passage with the interior of said bellows and a passage communicating the interior of said bellows with said one side of said pilot valve.

8. A pressure balanced regulating valve as defined in claim 2, wherein: said disc member and valve member are disposed for movement between said open and closed positions along an axis perpendicular to the direction of flow through the regulating valve.

9. A pressure balanced regulating valve as defined in claim 2, wherein: said disc member and valve member are disposed for movement between said open and closed positions along an axis aligned with the direction of flow through the regulating valve.

PO-1050
(5/69)

UNITED STATES PATENT OFFICE
CERTIFICATE OF CORRECTION

Patent No. 3,556,128            Dated January 19, 1971

Inventor(s) Paul J. Scaglione

It is certified that error appears in the above-identified patent and that said Letters Patent are hereby corrected as shown below:

Column 6, line 46, "on" should be -- in --.

Signed and sealed this 20th day of April 1971.

(SEAL)
Attest:

EDWARD M. FLETCHER, JR.
Attesting Officer

WILLIAM E. SCHUYLER, JR.
Commissioner of Patents